US008667686B2

(12) United States Patent
Zobel

(10) Patent No.: US 8,667,686 B2
(45) Date of Patent: Mar. 11, 2014

(54) METHOD OF PRODUCING TUBES AND A ROLLING MILL TRAIN FOR PRODUCING TUBES

(75) Inventor: Werner Zobel, Boblingen (DE)

(73) Assignee: Modine Manufacturing Company, Milwaukee, WI (US)

( * ) Notice: Subject to any disclaimer, the term of this patent is extended or adjusted under 35 U.S.C. 154(b) by 804 days.

(21) Appl. No.: 12/851,146

(22) Filed: Aug. 5, 2010

(65) Prior Publication Data

US 2011/0031296 A1    Feb. 10, 2011

(30) Foreign Application Priority Data

Aug. 6, 2009    (DE) .......................... 10 2009 036 335

(51) Int. Cl.
    *B21D 21/00*    (2006.01)

(52) U.S. Cl.
    USPC .................................................... 29/890.053

(58) Field of Classification Search
    USPC .................................................... 29/890.053
    See application file for complete search history.

(56) References Cited

U.S. PATENT DOCUMENTS

| 6,171,092 B1 * | 1/2001 | Galt et al. ...................... 425/138 |
| 2008/0295659 A1 * | 12/2008 | Tobin et al. ........................ 83/13 |

FOREIGN PATENT DOCUMENTS

| DE | 102006029378 | 1/2008 |
| DE | 102006033568 | 2/2008 |

* cited by examiner

*Primary Examiner* — David Bryant
*Assistant Examiner* — Moshe Wilensky
(74) *Attorney, Agent, or Firm* — Michael Best & Friedrich LLP

(57) ABSTRACT

A method for producing tubes for use in a heat exchanger that includes providing first and second metallic strips on a rolling mill train with predetermined breaking points using a device, deforming the strips to form the a tube, separating individual tubes from the tube at the predetermined breaking points, sensing positions of the predetermined breaking points in the strips using a sensing element which the strips pass through, transmitting signals relating to sensed positions of the predetermined breaking points of the strips to a computer, comparing the positions of the predetermined breaking points in the first and the second strips using the computer on the basis of the signals transmitted, and sending signals to the device using the computer which lead to the alignment of the positions of the predetermined breaking points in the first and the second strips.

5 Claims, 3 Drawing Sheets

METHOD OF PRODUCING TUBES AND A ROLLING MILL TRAIN FOR PRODUCING TUBES

CROSS-REFERENCE TO RELATED APPLICATIONS

This Application claims priority to German Patent Application No. 10 2009 036 335.1, filed Aug. 6, 2009, the entire contents of which are hereby incorporated by reference herein.

BACKGROUND

The invention relates to a process for producing tubes, in particular for use in heat exchangers, from at least two metallic strips on a rolling mill train.

A production process and a rolling mill train are described in DE 10 2006 033 568 A1. The distances between the predetermined breaking points are determined according to the desired tube lengths. However, there are at least two, preferably even three separate strips. With respect to making the predetermined breaking points coincide, said application proposes that the speed of the strips be matched. When they are deformed to form the corresponding tube part, the strips are subjected to extreme loading, including tensile stresses, which may lead to changes in length in the strips. Since the strips are extremely thin, even temperature fluctuations presumably make themselves noticeable in that the distances between the predetermined breaking points are changed. This may result in tubes with predetermined breaking points that do not match at the ends, and this can lead to unusable tubes if certain permissible tolerances should be exceeded.

SUMMARY

The object of the present invention is to improve the above-defined production process with respect to the accuracy of the introduction of the predetermined breaking points into the tubes and the degree to which they coincide on the finished tube.

The invention provides that a master sensing element is assigned to one of the strips which pass through and senses the position of the predetermined breaking points therein, that a slave sensing element senses the positions of the predetermined breaking points in another strip which passes through, that the master sensing element forms a communicating reference system together with the slave sensing element via a computer, and that the positions of the predetermined breaking points in at least two strips are compared and aligned with the positions of the predetermined breaking points of the master sensing element strip. Suitable sensing elements are preferably cameras and corresponding image-processing software, i.e. optical detection systems which can detect and process the predetermined breaking points.

The above mentioned alignment of the positions is preferably carried out by corresponding start signals being triggered earlier or later at devices for introducing the predetermined breaking points, these devices being assigned to the strips. This step is carried out until the positions coincide.

The computer is equipped with regulation software and forms the control center for the entire system. At this control center, measurement data are received and compared and the appropriate commands are triggered. The execution of the commands is monitored. Specific tolerance limits relating to the coincidence of the positions are also predefined, and the process proceeds within these limits in a fully automated manner.

The tube is preferably produced from three strips. The distances between the predetermined breaking points are identical in all three strips since they predefine the tube lengths, it being necessary for the three parts of the tube to lie exactly at one level at the tube ends. The strips also move at identical speeds so that each strip covers the same distance per unit time. It can also be gathered from this that the time intervals between two predetermined breaking points are identical in all strips. However, it is possible to set the time intervals, as well as other parameters, on the computer, for example in order firstly to be able to react to changing external influences and secondly to be able, of course, to configure the rolling mill train for producing tubes for various heat exchanger applications which accordingly have different desirable tube lengths.

The master sensing element strip (master strip) is that strip which is sensed by the master sensing element. This applies correspondingly to the slave sensing element strip. The master strip as it were predefines the cycle. If it is ascertained that the predetermined breaking points in the strip sensed by the slave sensing element trail the predetermined breaking points in the master strip, the start signal, i.e. a pluse, is triggered earlier at the device which produces the predetermined breaking points in the slave strip. Conversely, if the predetermined breaking points in the slave strip precede the predetermined breaking points in the master strip, said pulse is accordingly triggered later. The regulation is accordingly carried out by appropriately shifting the triggering time for producing the predetermined breaking points in the slave strips.

The rolling mill train for carrying out a process for producing tubes from at least two "endless" metallic strips, wherein the rolling mill train is equipped with pairs of rolls and has a device for introducing predetermined breaking points and also has means for making the predetermined breaking points in the strips coincide, is characterized in that the means mentioned consist in at least one sensing element which is connected to a computer, the computer being connected to the device.

This results in individual tubes with tube parts which coincide perfectly at the tube ends, and these tubes are therefore ideal for use as tubes in a heat exchanger.

Processes and systems of the proposed type require high precision, in particular with respect to the setting of the parameters thereof, extensive know-how and qualified monitoring personnel.

The invention will now be described with reference to the accompanying drawings in an exemplary embodiment. The description which follows may contain information, features and advantages that may subsequently prove to be particularly significant.

DETAILED DESCRIPTION

Figure 1:
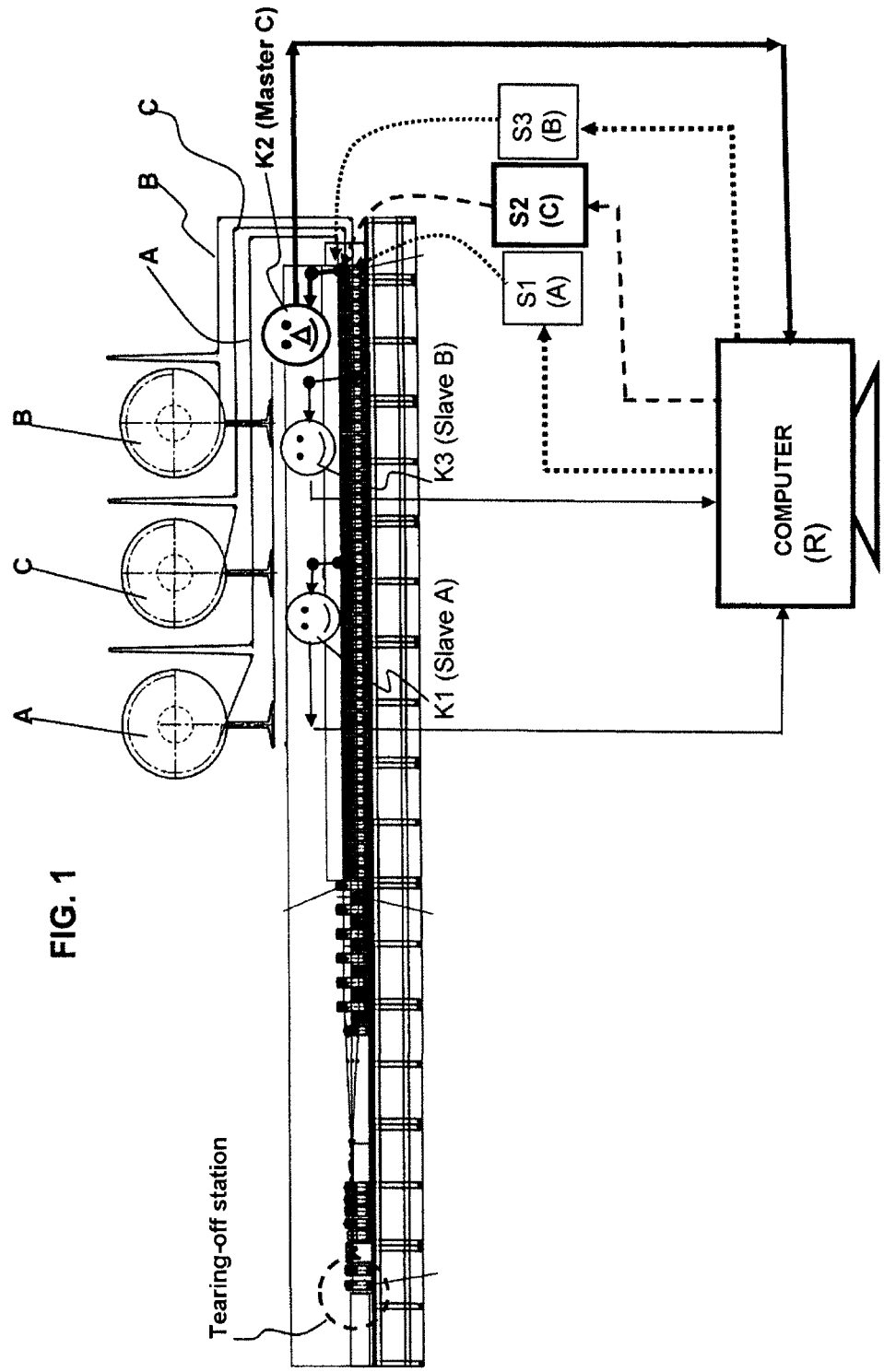
FIG. 1 shows a rolling mill train, in principle, in which the invention has been implemented.
Figure 2:
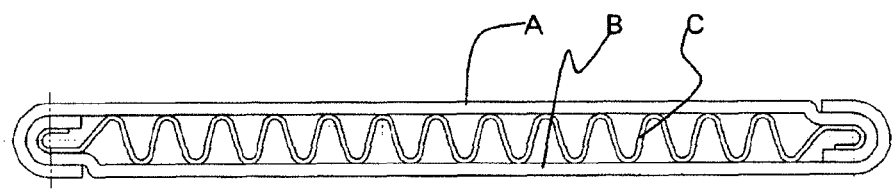
FIG. 2 shows a tube in cross section.

Since the exemplary embodiment shown refers to three-part tubes (FIG. 2, two wall parts A, B and an inner insert C), it can be gathered from FIG. 1 that three strip rolls A, B, C are present as starting material. These are sheet aluminum. The strip roll A generates part A, the strip roll B generates part B and, finally, the strip roll C generates part C of the flat tube 1. As shown in the illustration, in each case one very large loop is present in the strip directly behind the strip rolls A, B, C, and these loops serve to compensate different speeds or else stoppages of the strip. Depending on requirements, a plurality of loops can also be provided, which is also the case from a practical point of view. In this exemplary embodiment, the three predetermined breaking point devices S1, S2, S3 are already situated directly at the start of the rolling mill train, and these devices introduce the predetermined breaking points S into the strip rolls A, B, C (see also FIG. 4). Part C is then deformed by means of pairs of rolls (not shown in detail) over a corresponding distance in such a manner as to provide the configuration shown in FIG. 2. The three predetermined breaking point stations S1, S2, S3 are thus adjoined by a section of the rolling mill train in which one strip material C is deformed so as to form part of the subsequent tube. The strip rolls A and B merely roll through said distance without being significantly deformed there. The edge deformations on parts A and B are then formed and part C is mounted in between parts A and B (not shown in detail). However, reference can be made in this regard to patent application DE10-2006-029 378.9. In doubt, the entire content of said application should be regarded as disclosed at this point.

When parts A, B, C have been joined to form the tube 1, then an endless tube 1 is initially provided (as shown in the cross section in FIG. 2), from which the individual tubes 1 are then to be separated.

Figure 3:
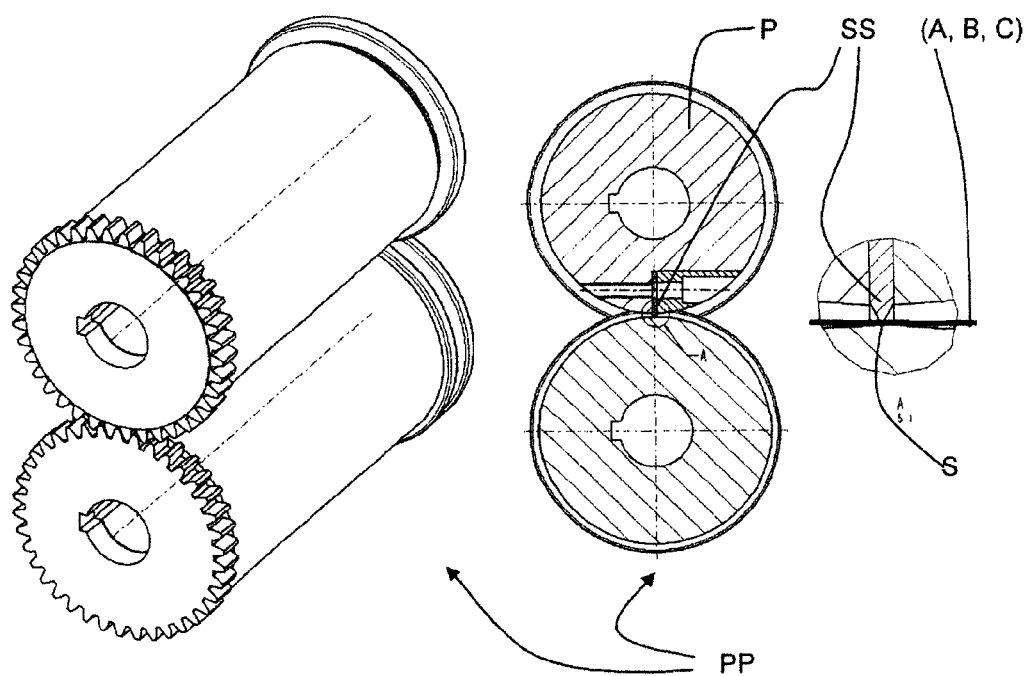
FIG. 3 shows, in the form of a perspective view, a sectional view and a detail from the sectional view, a pair of rolls for producing predetermined breaking points.

The three predetermined breaking point devices S1, S2 and S3 (FIG. 3, FIG. 4) can be of identical design. In the exemplary embodiment, the predetermined breaking point devices 51, S2, S3 comprise a pair of rolls PP. One (the lower) roll P preferably runs freely and guides part A, B or C, which is transported between the rolls P. The other (upper) roll P is formed with a projecting predetermined breaking point punch SS. Open-loop and closed-loop control means known per se are used to hold the other roll P with the predetermined breaking point punch SS in a waiting position. In this position, the predetermined breaking point punch SS is located horizontally on the roll P. The means mentioned then ensure that the roll P is moved abruptly with a high rotational speed so as to come into the action position shown, in which the predetermined breaking point punch SS is in engagement and the predetermined breaking points S are produced. The rotational speed or the peripheral speed of the rolls P is preferably higher than the transport speed of the strip, in order to ensure that the strip does not curl up.

Figure 4:
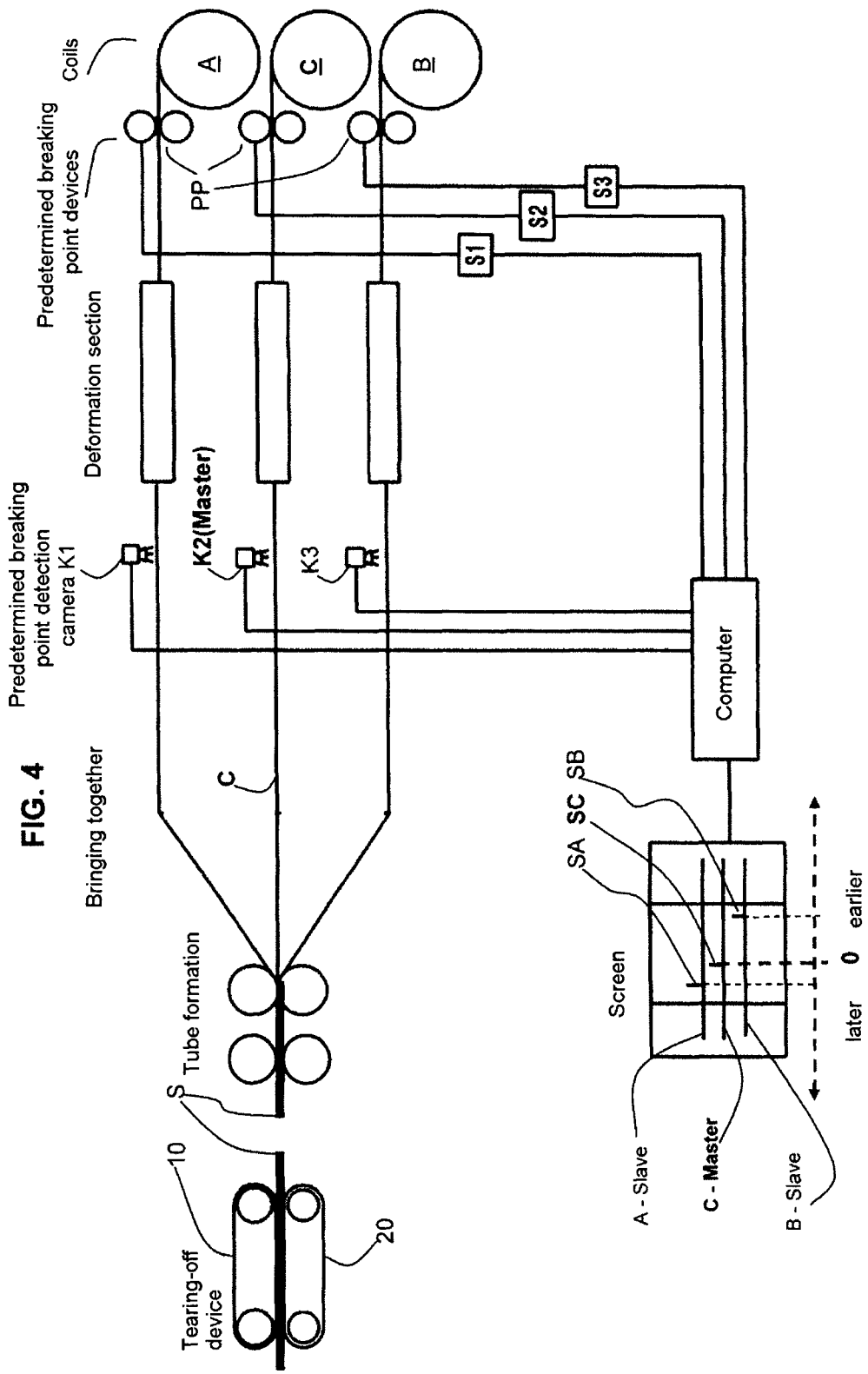
FIG. 4 shows another abstracted diagram of the invention.

Furthermore, it can be gathered from the exemplary embodiment shown in FIG. 1 and FIG. 4 that the strip C deformed, as mentioned, to form the inner insert of the tube has been selected as the master strip. Accordingly, an optically operating master sensing element K2 has been assigned to this strip C. The master sensing element K2 is connected to a computer R. Furthermore, the slave sensing element K3 assigned to the strip B and the slave sensing element K1 assigned to the strip A can be seen, and these elements are likewise optically operating elements and are also connected to the computer R. In addition, the computer R is connected to the predetermined breaking point devices S1, S2, and S3 which, in addition to the above-described mechanical configuration, are also equipped with suitable electrical/electronic devices which are known per se, receive and execute commands and have merely been shown as a blackbox. In practice, the blackbox does not necessarily have to be separate, as shown, but instead can be combined with, for example, servomotors (not shown) of the devices. Predetermined breaking points S detected by the sensing elements K2, K1 and K3 are converted into pulses and transmitted to the computer R. The computer R gives precedence to those pulses which originate from the master sensing element K2, i.e. conversely the pulses from the slave sensing element have a subordinate position. By comparing the pulses from K2 with the pulses from K1 and K3, the computer R detects whether the predetermined breaking points S in the three strips A, B, C coincide or not. If these points do not coincide, the computer R sends corresponding signals to the blackbox S1 and S3, and these signals lead to a shift in the time at which the predetermined breaking points S are introduced into the slave strips A and B. Here, it may be the case that, for example, the time has to be shifted to "earlier" in strip A and to "later" in strip B, or vice versa. It may, of course, also be the case that, owing to the specific situation, both times have to be shifted to "earlier" or to "later" in order to make the positions of the predetermined breaking points in the three strips coincide.

FIG. 4 also shows a screen for the computer R, on which the strips and the predetermined breaking points S thereof can be seen. For explanation reasons, the positions of the predetermined breaking points SC in the master strip C have been set to the time "zero". It can be seen that, in this exemplary embodiment, the predetermined breaking points SA in the slave strip A precede the predetermined breaking points SC in the master strip. However, the predetermined breaking points SB in the slave strip B trail the predetermined breaking points SC. The computer R accordingly arranges for the time at which the predetermined breaking points SA are introduced to be set to "later" and for the time at which the predetermined breaking points SB are introduced to be set (by a slightly larger time period) to "earlier", in order to establish coincidence.

As can also be seen from FIG. 4, the predetermined breaking point devices PP, as mentioned, are situated directly at the start of the rolling mill train. This means that the predetermined breaking points S are introduced into the still undeformed strips A, B, C. The predetermined breaking point device PP can also be a single device incorporating the three devices. It is essential that the punches SS thereof can be controlled individually so that they can be activated at the time determined by the computer R. In FIG. 4, the sensing elements K1, K2, K3 (cameras with image-processing software) are likewise approximately at one level. It is also the case for the sensing elements that they can be integrated in a single sensing element which can fulfill the functions described for all strips.

Although the system can, but does not have to, register each individual predetermined breaking point S in the strips and convert these into signals, it is entirely sufficient in many cases to register every third or fourth predetermined breaking point and to process the latter as described. A corresponding regulation can be made, for example, depending on the tube lengths to be produced and/or on the speed present.

Furthermore, the system can be designed in such a way that the speeds of the strips A, B, C are also included in the computer system. It is therefore possible for the uniformity of the speeds in the strips to be monitored. If required, the speeds can be appropriately readjusted. For this purpose, the computer R is connected to the drive motors of the rolls of the strips, for example servomotors. In this case, that servomotor which is assigned to the master strip can also be specified as the master servomotor.

As FIG. 4 also shows, individual tubes are separated at the end at the predetermined breaking points S. For this purpose, a tearing-off device formed from two pairs of rolls is provided, the rolls of these pairs of rolls being connected by transport belts 10, 20. The belts can be used to transmit a high tearing force and to prevent slippage.

What is claimed is:

1. A method for producing tubes for use in a heat exchanger comprising:
    providing a first metallic strip and a second metallic strip on a rolling mill train with predetermined breaking points using a device;
    deforming-the first and the second metallic strips to form a tube;
    separating individual tubes from the tube at the predetermined breaking points that have previously been made to coincide;
    sensing positions of the predetermined breaking points in the first metallic strip and the second metallic strip using a sensing element which the first metallic strip and the second metallic strip pass through;
    transmitting signals relating to sensed positions of the predetermined breaking points of the first and the second metallic strips to a computer;
    comparing the sensed positions of the predetermined breaking points in the first and the second metallic strips using the computer on the basis of the signals transmitted; and
sending signals to the device using the computer which lead to aligning the positions of the predetermined breaking points in the first and the second metallic strips,
    wherein sensing positions of the predetermined breaking points includes sensing the predetermined breaking point of the first metallic strip with a first sensing element specified for the first metallic strip and sensing the predetermined breaking point of the second metallic strip with a second sensing element specified for the second metallic strip,
    wherein sensing positions of the predetermined breaking point includes specifying the first sensing element is as a master sensing element and specifying the second sensing element as a slave sensing element, and
    wherein aligning the positions of the predetermined breaking points takes place in such a manner that the time of corresponding start signals is regulated to "earlier" or "later" at the device for introducing the predetermined breaking points, which is assigned to the slave sensing element, until the positions of the breaking points are aligned with one another.

2. The method of claim 1, further comprising setting the first metallic strip and the second metallic at an identical strip speed.

3. A method for producing tubes for use in a heat exchanger comprising:
    providing a first metallic strip and a second metallic strip on a rolling mill train with predetermined breaking points using a device;
    deforming-the first and the second metallic strips to form a tube;
    separating individual tubes from the tube at the predetermined breaking points that have previously been made to coincide;
    sensing positions of the predetermined breaking points in the first metallic strip and the second metallic strip using a sensing element which the first metallic strip and the second metallic strip pass through;
    transmitting signals relating to sensed positions of the predetermined breaking points of the first and the second metallic strips to a computer;
    comparing the sensed positions of the predetermined breaking points in the first and the second metallic strips using the computer on the basis of the signals transmitted; and
    sending signals to the device using the computer which lead to aligning the positions of the predetermined breaking points in the first and the second metallic strips,
    wherein sensing positions of the predetermined breaking points includes sensing the predetermined breaking point of the first metallic strip with a first sensing element specified for the first metallic strip and sensing the predetermined breaking point of the second metallic strip with a second sensing element specified for the second metallic strip,
    wherein sensing positions of the predetermined breaking point includes specifying the first sensing element is as a master sensing element and specifying the second sensing element as a slave sensing element, and
    wherein the slave sensing element is a first slave sensing element, wherein sensing positions of the predetermined breaking points includes the master sensing element cooperating with the first slave sensing element and a second slave sensing element via the computer, the second slave sensing element sensing the position of the predetermined breaking points in a third metallic strip.

4. The method of claim 3, further comprising comparing and aligning positions of the predetermined breaking points in the first, the second, and the third metallic strips with the positions of the predetermined breaking points of a master sensing element strip, in such a manner that the times of corresponding start signals are regulated to "earlier" or "later" at the device for introducing the predetermined breaking points, which is assigned to a second slave sensing element strip, and a device for introducing the predetermined breaking points which is assigned to a third slave sensing element strip, at least until the positions of the predetermined breaking points in the first, the second, and the third metallic strips coincide.

5. The method of claim 4, further comprising, assigning the master sensing element strip to one of the first, the second and the third metallic strips which is deformed to form an inner insert of the tube.

* * * * *